(No Model.)

W. C. SHIPHERD.
KING BOLT.

No. 316,192.　　　　　　　Patented Apr. 21, 1885.

WITNESSES
Wm. M. Monroe
Geo. W. King

INVENTOR
William C. Shipherd
by
Leggett & Leggett
Attorneys

UNITED STATES PATENT OFFICE.

WILLIAM C. SHIPHERD, OF CLEVELAND, OHIO.

KING-BOLT.

SPECIFICATION forming part of Letters Patent No. 316,192, dated April 21, 1885.

Application filed August 26, 1884. (No model.)

*To all whom it may concern:*

Be it known that I, WILLIAM C. SHIPHERD, of Cleveland, in the county of Cuyahoga and State of Ohio, have invented certain new and useful Improvements in a King-Bolt-Clip Tie, Bolt, and Brace; and I do hereby declare the following to be a full, clear, and exact description of the invention, such as will enable others skilled in the art to which it pertains to make and use the same.

My invention relates to improvements in a king-bolt-clip tie or yoke, bolt, and reach-brace, the object being to journal the head and upper portion of the bolt in the yoke, and to provide, respectively, the bolt with a shank and the head of the brace with a socket of such shape in cross-section that the bolt is prevented from turning in the brace, to the end that all wear and turning are transferred from the nut and lower part of the bolt to the head and upper portion of the bolt and yoke.

A further object is to provide a tapering part of the bolt next under the head and a corresponding tapering seat in the yoke to take up the wear of the parts.

With these objects in view my invention consists in certain features of construction and in combination of parts hereinafter described, and pointed out in the claims.

Figure 1:
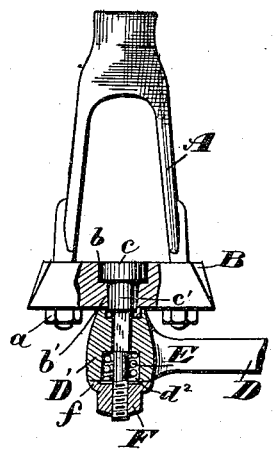
Figure 2:
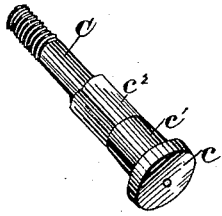
Figure 3:
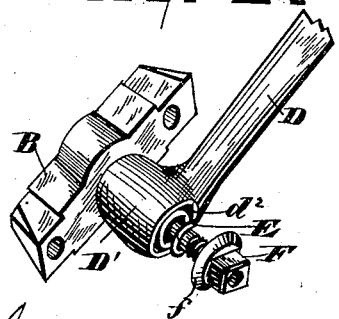
Figure 4:
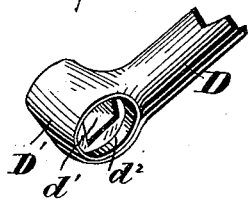

In the accompanying drawings, Figure 1 is a view in elevation of the king-bolt clip, yoke, and brace, with portions of the two latter in section to show the internal construction. Fig. 2 is an isometric view of the bolt that holds the plate and brace together. Fig. 3 is a view in perspective of the yoke and brace, with the nut partially removed to show the take-up spring. Fig. 4 is a view in perspective of the brace-head.

A represents the clip that embraces the axle, in the upper end of which is seated the head of the king-bolt. (Not shown.) The screw ends of the clip pass in the usual manner through the yoke B, and are provided with the nuts $a$. The yoke is of considerable thickness, and in the central part and from the upper side is the countersink $b$, in which fits the head $c$ of the bolt C. Below the countersink is the tapering socket $b'$, that fits the tapering part $c'$ of the bolt C.

D is the brace that extends rearward and upward and joins the reach (not shown) in the usual manner.

D' is the head of the brace, that has a shallow countersink, $d$, that may receive the end of the part $c'$ of the bolt C when from the wear of the parts the part $c'$ extends below the yoke. Below the recess $d$ is a square hole or socket, $d'$, that fits the square shank $c^2$ of the bolt. Below the square hole, and extending through the remainder of the head, is the annular recess $d^2$, in which is located the take-up spring E.

The end of the bolt is provided with the cap-nut F, the flanged part $f$ of which covers the recess $d^2$, and when the nut is screwed home compresses the spring E within the chamber $d^2$. The recoil of the spring draws the upper part of the bolt into its seat, and presses the head D' against the bottom of the yoke, and prevents the parts from rattling.

By reason of the square shank $c^3$ of the bolt fitting the square socket in the brace-head there is no movement between these parts, and there is therefore nothing to loosen the nut or to cause wear on the nut or lower portion of the bolt. As the bolt is made to turn in the yoke, the wear comes entirely on the yoke and the head and part $c'$ of the bolt, and these parts, by reason of their strength and peculiar construction, as aforesaid, are well adapted to sustain the wear.

By reason of the tapering part $c'$ of the bolt and the corresponding tapering seat, $b'$, the wear of these parts is taken up, so that no "lost motion" is had.

In place of the square shank $c'$, any irregular shank with a corresponding socket that would prevent the bolt from turning in the brace-head would answer the purpose.

The take-up here shown is a spiral spring, E, but is not necessarily confined to this class, as rubber or any elastic material would answer the purpose.

What I claim is—

1. The combination, with a yoke and a bolt seated or journaled in said yoke and provided with an angular portion, of a brace-head having an opening therein corresponding in shape to the angular portion of the bolt, and with a recess in its lower face, a spring located within said recess and encircling the bolt, and a nut secured on the bolt and forming a seat for the spring.

2. The combination, with a yoke having a tapering seat or cavity formed therein, and a bolt having an angular portion and an enlarged tapering portion, which latter rests within said cavity, of a brace-head having an opening therein, which latter corresponds in shape to the angular portion of the bolt, a spring encircling the bolt, and a nut secured on the bolt and forming a seat for the spring, substantially as set forth.

In testimony whereof I sign this specification, in the presence of two witnesses, this 19th day of July, 1884.

WILLIAM C. SHIPHERD.

Witnesses:
ALBERT E. LYNCH,
CHAS. H. DORER.